United States Patent [19]
Tokunaga

[11] Patent Number: 5,917,252
[45] Date of Patent: Jun. 29, 1999

[54] LOAD CONTROL SYSTEM

[75] Inventor: Masahiro Tokunaga, Nagoya, Japan

[73] Assignees: Harness System Technologies Research, Ltd., Nagoya; Sumitomo Wiring Systems, Ltd., Mie; Sumitomo Electric Industries, Ltd., Osaka, all of Japan

[21] Appl. No.: 08/906,000

[22] Filed: Aug. 4, 1997

[30] Foreign Application Priority Data

| Aug. 5, 1996 | [JP] | Japan | 8-205978 |
| Sep. 24, 1996 | [JP] | Japan | 8-251459 |
| Oct. 7, 1996 | [JP] | Japan | 8-265920 |

[51] Int. Cl.$^6$ .................................................. H02J 1/00
[52] U.S. Cl. ........................ 307/38; 307/31; 307/11; 307/139; 307/145; 315/312; 340/644
[58] Field of Search ................. 307/31, 32, 43, 307/64, 18, 19, 131, 139, 145, 85, 86; 340/333, 425.5, 458, 459; 315/169.3, 169.4, 324

[56] References Cited

U.S. PATENT DOCUMENTS

| 4,057,711 | 11/1977 | Asthana et al. |
| 4,180,744 | 12/1979 | Helwig, Jr. ................................. 307/39 |
| 4,213,182 | 7/1980 | Eichelberger et al. |
| 4,224,538 | 9/1980 | Cholin ...................................... 307/317 |
| 4,292,543 | 9/1981 | Reed, Sr. .................................. 307/35 |
| 4,331,956 | 5/1982 | Anderson ............................. 340/825.89 |
| 4,349,816 | 9/1982 | Miller et al. ............................... 345/76 |
| 4,397,021 | 8/1983 | Lloyd et al. |
| 4,398,131 | 8/1983 | Tarroux et al. ........................... 315/294 |
| 4,490,655 | 12/1984 | Feldman ................................... 307/254 |
| 4,562,550 | 12/1985 | Beatty et al. |
| 4,820,956 | 4/1989 | Slobodzian et al. ....................... 315/51 |
| 4,821,033 | 4/1989 | Mori et al. ........................... 340/825.79 |
| 5,608,275 | 3/1997 | Khosrowpour .......................... 307/130 |

FOREIGN PATENT DOCUMENTS

| 0 800 254 | 10/1997 | European Pat. Off. |
| 24 38 009 | 3/1976 | Germany. |
| A-7-123793 | 5/1995 | Japan. |
| 2 069 258 | 8/1981 | United Kingdom. |
| 2 115 240 | 9/1983 | United Kingdom. |
| WO 88 04517 | 6/1988 | WIPO. |
| WO 93/02498 | 2/1993 | WIPO. |
| WO 95 24758 | 9/1995 | WIPO. |
| WO 95 24759 | 9/1995 | WIPO. |

OTHER PUBLICATIONS

Patent Abstracts of Japan, vol. 016, No. 472, (E–1272) Sep. 30, 1992.
Patent Abstracts of Japan, vol. 097, No. 005, May 30, 1997.
Patent Abstracts of Japan, vol. 005, No. 059, (E–053), Apr. 22, 1981.

*Primary Examiner*—Jeffrey Gaffin
*Assistant Examiner*—Peter Zura
*Attorney, Agent, or Firm*—Oliff & Berridge, PLC

[57] ABSTRACT

Lamps LP1–LP9 are connected in a matrix form. Control devices Tr1–Tr6 are installed on connecting wires of the lines and rows of the matrix used for connecting the lamps LP1–LP9, respectively. Each of the connecting wires L1–L3 on each line is connected to a power supply Vcc via each of the control devices Tr1–Tr3. Further, each of the connecting wires L4–L6 is connected to the ground via each of the control devices Tr4–Tr6. Then the plurality of loads are connected to the control devices Tr1–Tr6 so as to control the loads by the control devices Tr1–Tr6, the number of which is smaller than the number of loads.

8 Claims, 14 Drawing Sheets

| LINE<br>ROW | CONNECTING WIRE L4 | CONNECTING WIRE L5 | CONNECTING WIRE L6 |
|---|---|---|---|
| CONNECTING WIRE L1 | LP1 | LP2 | LP3 |
| CONNECTING WIRE L2 | LP4 | LP5 | LP6 |
| CONNECTING WIRE L3 | LP7 | LP8 | LP9 |

FIG. 3

| Tr1 Tr2 Tr3 \ Tr4 Tr5 Tr6 | LLL | HLL | LHL | HHL | LLH | HLH | LHH | HHH |
|---|---|---|---|---|---|---|---|---|
| LLL | | | | | | | | |
| HLL | | LP1 | LP2 | LP1,2 | LP3 | LP1,3 | LP2,3 | LP1,2,3 |
| LHL | | LP4 | LP5 | LP4,5 | LP6 | LP4,6 | LP5,6 | LP4,5,6 |
| HHL | | LP1,4 | LP2,5 | LP4,5 | LP3,6 | LP1,4,3,6 | LP2,3,5,6 | LP1,2,3,4,5,6 |
| LLH | | LP7 | LP8 | LP7,8 | LP9 | LP7,9 | LP8,9 | LP7,8,9 |
| HLH | | LP1,7 | LP2,8 | LP1,2,7,8 | LP3,9 | LP1,3,7,9 | LP2,3,8,9 | LP1,3,7,9 |
| LHH | | LP4,7 | LP5,8 | LP4,5,7,8 | LP6,9 | LP4,6,7,9 | LP5,6,8,9 | LP4,5,6,7,8,9 |
| HHH | | LP1,4,7 | LP2,5,8 | LP1,2,4,5,7,8 | LP3,6,9 | LP1,3,4,6,7,9 | LP2,3,5,6,8,9 | ALL(LP1-9) |

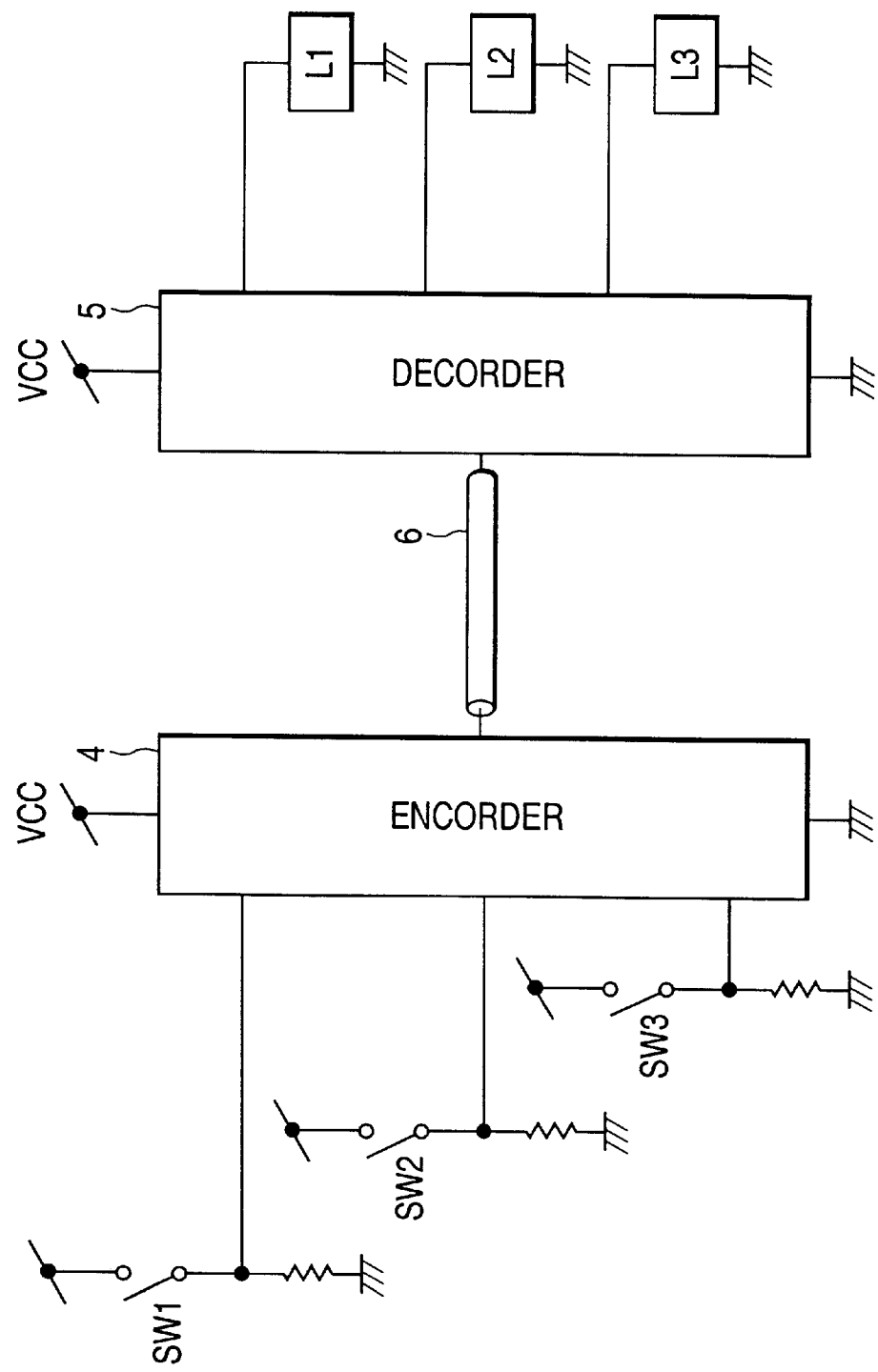

LOAD CONTROL SYSTEM

BACKGROUND OF THE INVENTION

The present invention relates to a load control system.

In a typical load control system, one load is controlled by one control device, except for a special load which is controlled by a plurality of control devices, for example, a power window motor which needs reversing.

In order to control the lighting of a plurality of lamps, for example, a control device Tr such as a relay and a power transistor is installed between each of the lamps LP1–LPn and a power supply Vcc or between each of the lamps LP1–LPn and the ground G as shown in FIG. 16. Then the lamps LP1–LPn are lighted by causing the control devices Tr to conduct by means of switches.

However, there still exists a problem arising from an increase in cost because the control devices equal in number to the loads are required.

Since wiring is increasingly needed corresponding to the number of control devices increases, the wiring work becomes complicated. In the case of a substrate, the pattern also tends to become complicated. This results in developing the problem of raising the aforementioned cost further.

According to the conventional arrangement, since the conductive wires equal in number to the loads desired to be driven are required in such a load driving system and when this system is employed for driving a number of loads such as lamps and door locks in automobiles, for example, wire harness such as the conductive wires tend to become multiplied and complicated.

In order to decrease the number of conductive wires such as wire harness, recently, as shown in FIG. 17, the switches SW1, SW2, SW3 are connected to the corresponding signal input terminals of an encoding microcomputer 4; the power supply terminals of the loads L1, L2, L3 are connected to the corresponding output terminals of a decoding microcomputer 5; and further a multiplex communication cable 6 is used for connecting these microcomputers 4, 5. With this arrangement, the code generated in the encoding microcomputer 4 on the basis of the switches SWI, SW2, SW3 that have been actuated is transmitted to the decoding microcomputer 5 via the multiplex communication cable 6, and the decoding microcomputer 5 drives the desired loads L1, L2, L3 according to the code, so that the number of conductive wires is greatly decreased.

Notwithstanding, the load driving system like this becomes costly because it requires the encoding and decoding microcomputers 4, 5.

SUMMARY OF THE INVENTION

It is therefore an object of the present invention to exert control over a plurality of loads with a small number of control devices.

It is another object of the present invention to provide a load control system capable of causing target loads to be driven without driving undesired loads.

It is still another object of the present invention to decrease the number of conductive wires for driving loads without necessitating expensive devices such as microcomputers.

In order to solve the foregoing problems according to the present invention, a load control system for controlling loads by control devices is such that a plurality of loads are connected to the control devices; and the loads are controlled by the control devices, the number of which is smaller than the number of loads.

At this time, the plurality of loads are connected in the form of an N-dimensional matrix (N=integer of 2 or greater) and the control devices are installed in the respective dimensions, so that the loads are made controllable by connecting the plurality of loads to the control device.

Further, the control devices are installed on the respective lines as well as the respective rows of the matrix, and each line is connected to a power supply via the control device whereas each row is connected to the ground via the control device or otherwise each line is connected to the ground via the control device whereas each row is connected to the power supply via the control device, whereby any one of the desired loads is made controllable by properly selecting and operating the control device installed on each line and on each row.

Further, a relay or a semiconductor switching device may be employed for the control device.

In order to solve the foregoing problems according to the present invention, a load control system for controlling loads by a combination of control devices, the number of which is smaller than the number of loads is such that the loads are controlled by the combination of control devices which is controlled in a time sharing control mode. Thus, the plurality of loads can simultaneously be driven by driving only the target loads without driving undesired loads in the time sharing control mode.

The loads are then connected in the form of an N-dimensional matrix (N=integer of 2 or greater) and the control devices are installed in the respective dimensions and controlled in the time sharing control mode. In the case of a two-dimensional matrix, for example, the plurality of loads can be driven outwardly and simultaneously by controlling the control devices on line and row in each dimension on the time sharing control mode so as to sequentially drive the individual load.

The loads are connected to a power supply for supplying a voltage higher than a rated one and controlled in the time sharing control mode. Thus, mean current flowing into the load under control in the time sharing control mode becomes equal to current not under control in the time sharing control mode.

Furthermore, in order to solve the foregoing problems according to the present invention, a load driving apparatus is constituted of a high-voltage, a medium-voltage and a low-voltage power supply, a pair of switches which are connected in series between the high-voltage and low-voltage power supplies, one conductive wire which is drawn from a common connecting node where the switches are joined together, and a pair of semiconductor devices whose one ends are respectively connected to the conductive wire and which conduct in directions opposite to each other, wherein one ends of the current supply terminals of the two loads are respectively connected to the other ends of these semiconductor devices, whereas the other ends of the current supply terminals thereof are connected to the medium-voltage power supply.

In the load driving apparatus according to the present invention, a circuit including the high- or low-voltage power supply and the medium-voltage power supply is formed when one of the switches is turned on. However, the function of the pair of semiconductor devices which conducts in opposite directions causes only one of the two loads to be supplied with the current. Therefore, the load which is supplied with the current is unconditionally determined when one switch to be turned on is determined, so that two loads can selectively be driven. In other words, the two loads can selectively be driven by means of the one conductive wire since the load which is driven can be selected by changing the direction of the current caused to flow into the one conductive wire. Further, the position of the semiconductor may be replaced with those of the loads.

Moreover, a load driving system may be built up by providing a plurality of such load driving apparatus. With this arrangement, a number of loads can selectively be driven by conductive wires, the number of which is half the number of loads.

BRIEF DESCRIPTION OF THE DRAWINGS

FIG. 3 is a diagram illustrating the light-on state according to the first embodiment of the present invention;

FIG. 17 is a block diagram illustrating another conventional load driving system by way of example.

DETAILED DESCRIPTION OF THE PREFERRED EMBODIMENTS

Figures 1, 2:
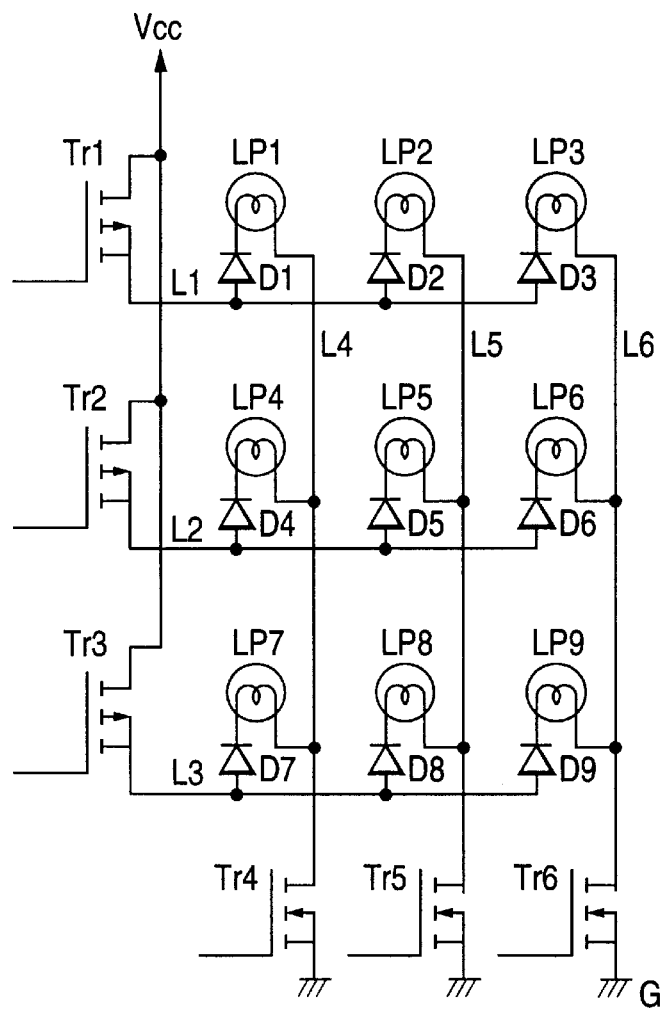
FIG. 1 is a wiring diagram according to a first embodiment of the present invention.
FIG. 2 is a table showing connections according to the first embodiment of the present invention.

Referring to the drawings, there will be given a description of embodiments of the present invention.

First Embodiment

FIG. 1 refers to a case where when lamps LP1–LP9 are set as loads, the lighting of the lamps LP1–LP9 is controlled. In this case, a description will be given of a load control system according to the present invention when nine lamps LP1–LP9 are connected in the form of a 3×3 two-dimensional matrix.

As shown in FIG. 1, one terminal of the lamp LP1 is connected to a connecting wire L1 through a reverse current prevention diode D1, and the other terminal thereof to a connecting wire L4. Further, one terminal of the lamp LP2 is connected to the connecting wire L1 through a reverse current prevention diode D2, and the other terminal thereof to a connecting wire L5. Likewise, the lamp LP3 is connected to the connecting wires L1 and L6; the lamp LP4 to the connecting wires L2 and L4; the lamp LP5 to the connecting wires L2 and L5; the lamp LP6 to the connecting wires L2 and L6; the lamp LP7 to the connecting wires L3 and L4; the lamp LP8 to the connecting wires L3 and L5; and the lamp LP9 to the connecting wires L3 and L6.

Thus, the lamps LP1–LP9 are connected in the matrix form as shown in Table of FIG. 2; however, by this matrix is meant that these lamps are not necessarily so arranged physically but only logically.

On the other hand, one ends of the connecting wires L1–L3 are connected to a power supply Vcc via the respective control devices Tr1–Tr3. Further, one ends of the connecting wires L4–L6 are connected to the ground G via the respective control devices Tr4–Tr6. As the control devices Tr1–Tr6, use can be made of power MOS semiconductors which can deal with a large amount of power as shown in FIG. 1 other than relays or bipolar transistors. In this case, it is preferred to use P-channel control devices Tr1–Tr3 and N-channel control devices Tr4–Tr6.

When, for example, the control devices Tr1 and Tr4 are simultaneously turned on in the embodiment of the present invention thus constituted, there is formed a circuit comprising power supply Vcc→control device Tr1→reverse current prevention diode D1→lamp LP1→control device Tr4→ground G, so that the lamp LP1 is lighted. When the control devices Tr1 and Tr5 are simultaneously turned on similarly, there is formed a circuit comprising power supply Vcc→control device Tr1→reverse current prevention diode D2→lamp LP2→control device Tr5→ground G, so that the lamp LP2 is lighted.

Accordingly, any one (LP1) of the lamps can be lighted by simultaneously turning on two (Tr1 and Tr4) of the control devices.

When the control devices Tr1, Tr3 and Tr4 are simultaneously turned on, for example, the lamps LP1 and LP7 can simultaneously be lighted. Further, when the control devices Tr1, Tr4, Tr5 and Tr6 are simultaneously turned on, the lamps LP1, LP2, LP3 can be lighted.

Thus, the positions and the number of lamps LP1–LP9 to be lighted can be chosen by properly choosing control devices Tr1–Tr6 to be turned on as shown in FIG. 3 (in Table of FIG. 3, L: control device in OFF state; and H: control device in ON state).

Therefore, nine loads are made controllable by six control devices Tr1–Tr6. Further, 9×2=18 connecting wires that have heretofore been required can be reduced to six when return wires (the ground) are correspondingly required.

As is obvious from FIGS. 1–3, according to the embodiment of the present invention, and the lamps LP1, LP5 are successively lighted if the control devices Tr1, Tr4 and Tr2 and Tr5 are successively turned on so as to light the lamps LP1 and LP5, for example, when the lamps LP1–LP9 different in "line and row" are lighted.

For this reason, it is only needed to prevent the combination of control devices Tr1–Tr6 from being applied or from being connected if such a lighting mode as stated above is undesired.

Second Embodiment

Figure 4:
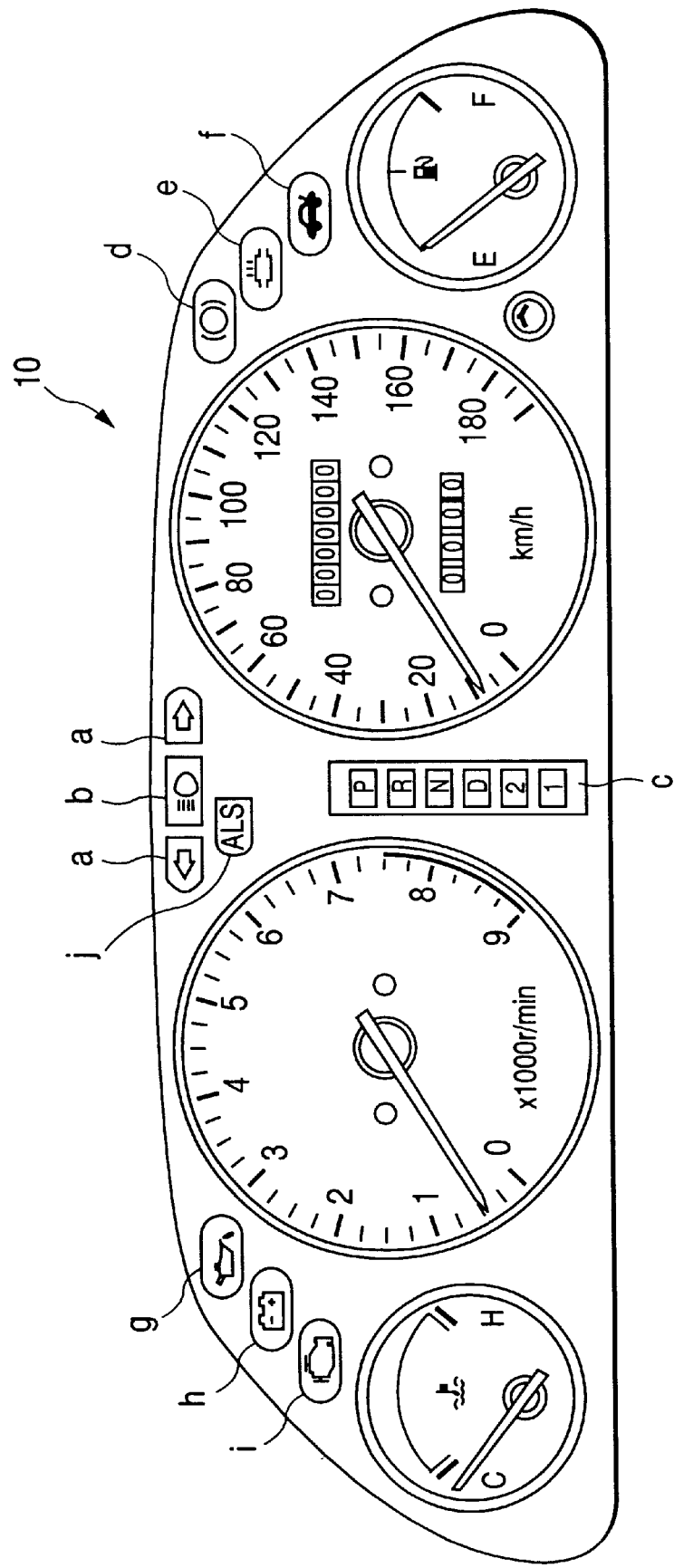
FIG. 4 is an elevational view of a second embodiment of the present invention.

A description will subsequently be given of a second embodiment of the present invention which is applied to controlling the lighting of pilot and warning lamps of the meter panel 10 of an automotive inner panel as shown in FIG. 4.

Figure 5:
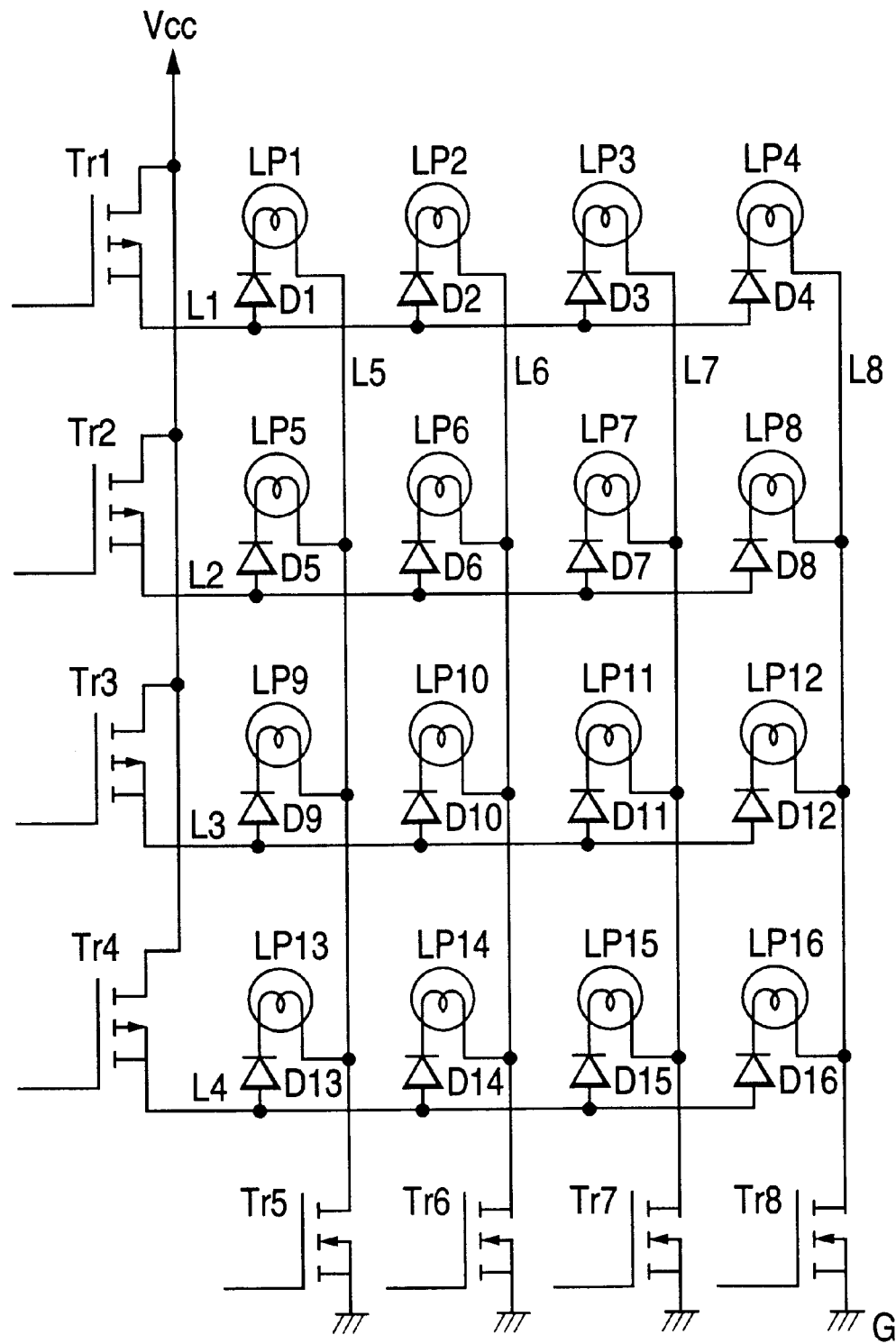
FIG. 5 is a wiring diagram according to the second embodiment of the present invention.

In this case, there are 10 kinds of pilot/warning lamps a–j for the panel 10. Of these lamps, a direction indicator lamp a indicates two positions: left and right. A changeover lever position indicator lamp c of a shift lever indicates six positions. Therefore, 16 pilot/warning lamps a–j are controlled in connection with switching on-off of them. FIG. 5 shows circuitry in which the pilot/warning lamps a–j are made controllable by eight control devices Tr1–Tr8.

Therefore, the number of control devices can thus be halved instead of 16 control devices that have heretofore been employed for controlling 16 loads.

As described in the above embodiments of the present invention, the sufficient number of return wires, if necessary, will come up to eight instead of 16×2=32 that have heretofore been required.

Although a description has been given of the pilot and warning lamps of the meter panel of the inner panel according to this embodiment of the present invention, the present invention is not limited to the embodiments thereof but may be applied to indicating lamps for mobile audio and navigation systems. The load control system according to the present invention may also be considered usable for not only indicating lamps but also, for example, the driving of multipoint type injection and the like.

Although a description has further been given of a case where each line of the aforementioned matrix is connected via the control device to the power supply, and each row to the ground according to the embodiments of the present invention, each line may conversely be connected to the ground, and each row to the power supply.

Figure 6:
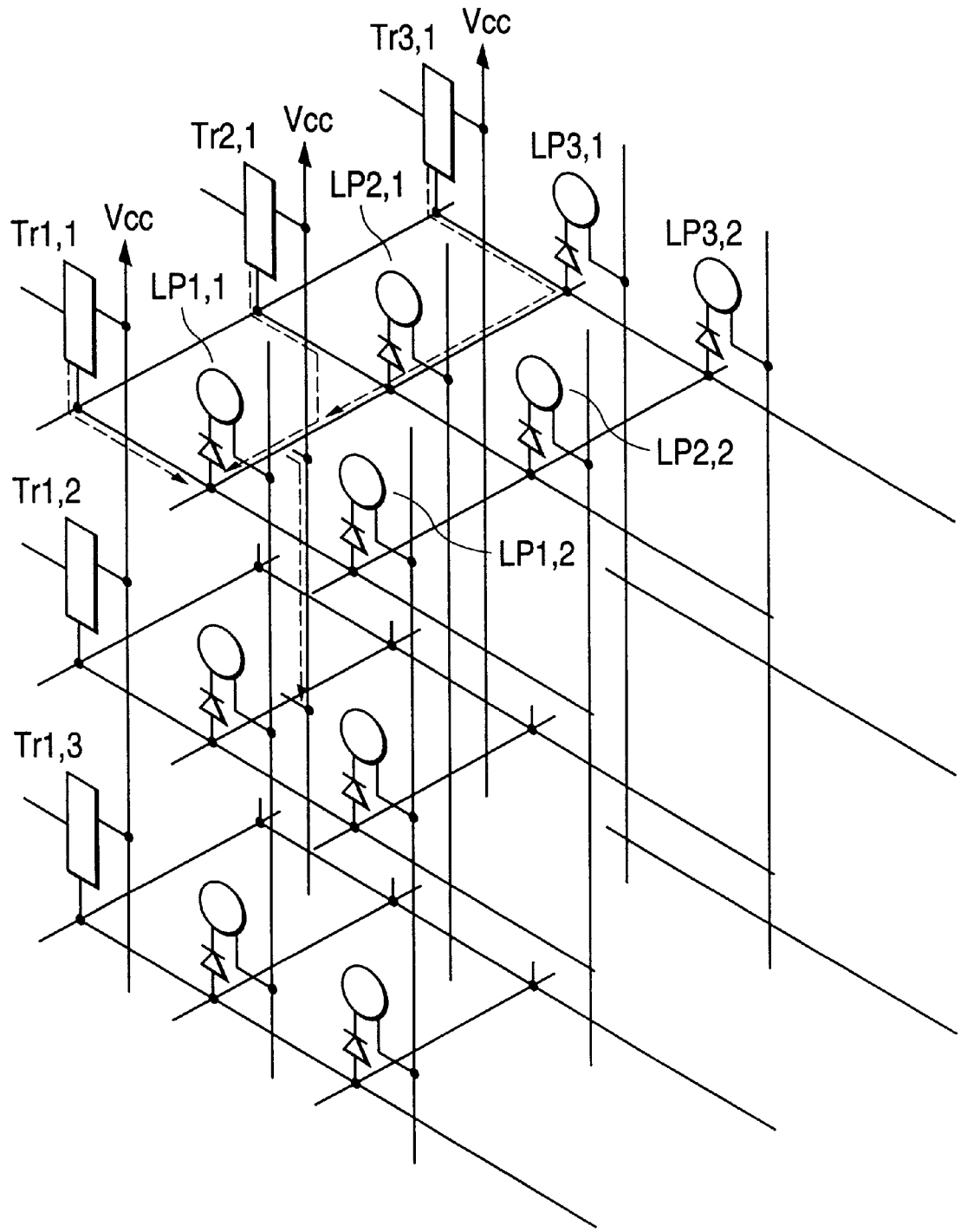
FIG. 6 is functional diagram illustrating another mode according to the present invention.

Although a description has also been given of the two-dimensional connections according to the embodiments of the present invention, the present invention is not limited to these embodiments thereof but may be applied to three-dimensional connections as exemplarily shown in FIG. 6. In so doing, a number of circuits for lighting one lamp LPm,n can be formed by selecting a control device Trm,n as shown by an arrow of FIG. 6, whereby inconvenience due to lighting the lamp LP3 can be obviated when the lamps LP1 and LP5 situated on different "line and row" are lighted as described in the first embodiment of the present invention.

As set forth above, since loads are made controllable by control devices, the number of which is smaller than the number of such loads; for example, the driving of nine loads is rendered controllable by six control devices instead of nine control devices that have heretofore been required as described in the embodiments of the present invention. In the case where 16 loads are controlled, further, eight control devices instead of 16 that have heretofore been required are usable for controlling 16 loads. Therefore, the number of control devices is reduced and thus cost reduction can be realized. Since the amount of wiring is then reducible in proportion to the required number of control devices, a decrease in not only the wiring work but also production cost becomes achievable.

Third Embodiment

According to the above-mentioned first embodiment as shown in FIG. 1, the lamps LP2 and LP4 are also lighted when the lamps LP1 and LP5 are simultaneously lighted by turning on the control devices Tr1, Tr2, Tr4 and Tr5, for example.

In other words, undesired loads are simultaneously driven when it is attempted to drive a plurality of loads different in "line and row."

According to the third embodiment, it is provided a load control system capable of causing target loads to be driven without driving undesired loads.

Figure 7:
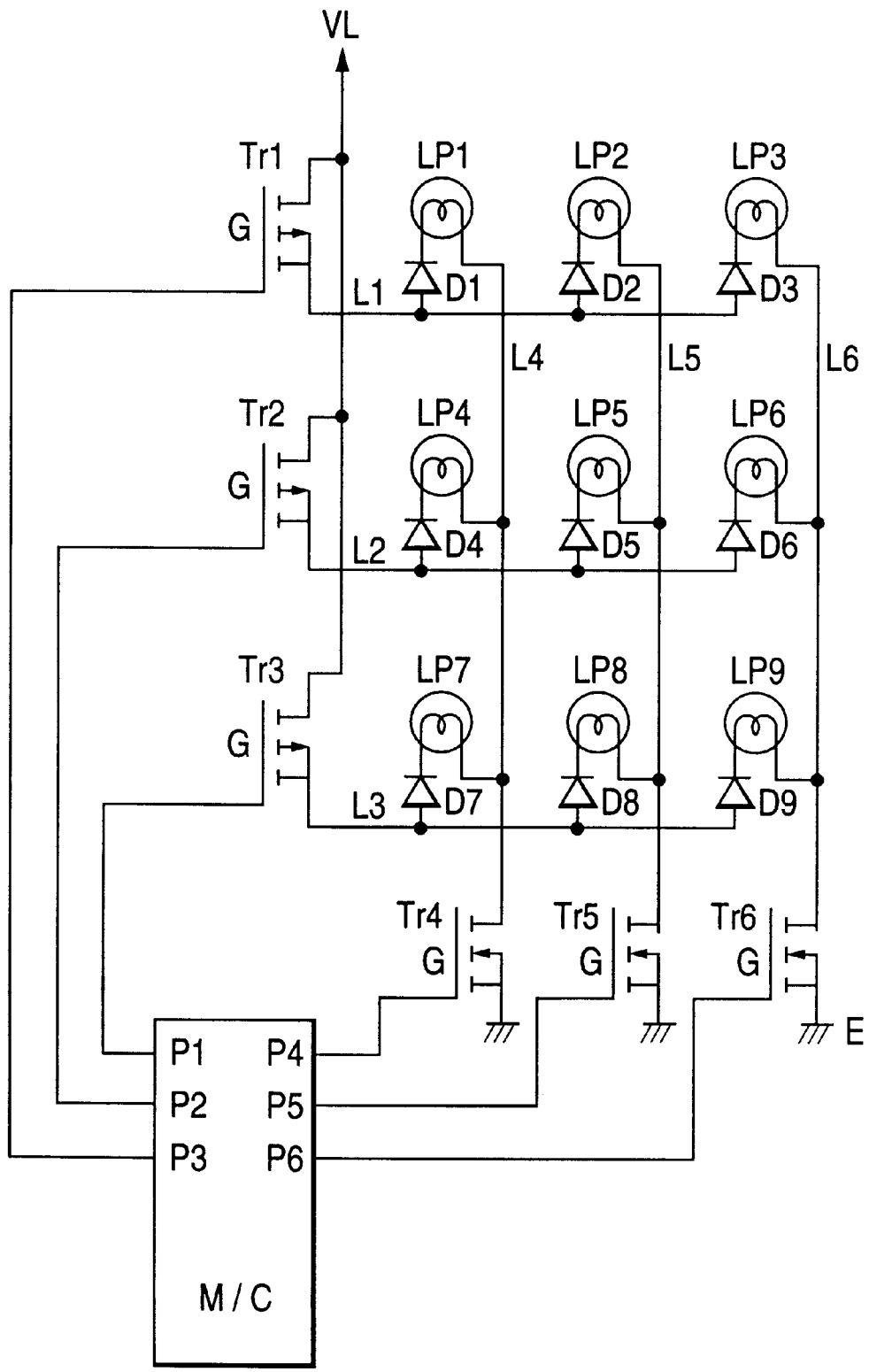
FIG. 7 is a block diagram of a third embodiment of the present invention.

FIG. 7 refers to a case where when lamps LP1–LP9 are set as loads, the lighting of the lamps LP1–LP9 is controlled.

In this case, nine lamps LP1–LP9 are connected in the form of a 3×3 two-dimensional matrix.

As shown in FIG. 7, one terminal of the lamp LP1 is connected to a connecting wire L1 through a reverse current prevention diode D1, and the other terminal thereof to a connecting wire L4. Further, one terminal of the lamp LP2 is connected to the connecting wire L1 through a reverse current prevention diode D2, and the other terminal thereof to a connecting wire L5. Likewise, the lamp LP3 is connected to the connecting wires L1 and L6; the lamp LP4 to the connecting wires L2 and L4; the lamp LP5 to the connecting wires L2 and L5; the lamp LP6 to the connecting wires L2 and L6; the lamp LP7 to the connecting wires L3 and L4; the lamp LP8 to the connecting wires L3 and L5; and the lamp LP9 to the connecting wires L3 and L6.

Thus, the lamps LP1–LP9 are connected in the matrix form; however, by this matrix is meant that these lamps are not necessarily so arranged physically but only logically.

On the other hand, one end of the connecting wires L1–L3 are connected to a power supply VL via the respective control devices Tr1–Tr3. Further, one ends of the connecting wires L4–L6 are connected to the earth E via the respective control devices Tr4–Tr6.

As the control devices Tr1–Tr6, use can be made of switching elements such as unipolar transistors and bipolar transistors. Therefore, according to this embodiment of the present invention, power MOS semiconductor devices which can deal with a large amount of power as shown in FIG. 7 are employed. In this case, it is preferred to use P-channel control devices Tr1–Tr3 and N-channel control devices Tr4–Tr6.

These control devices Tr1–Tr6 are connected to a microcomputer 1.

The microcomputer 1 is used as a controller for controlling each of the control devices Tr1–Tr6 in the time sharing control mode. According to this embodiment of the present invention, the microcomputer 1 is of a one-chip type having parallel ports P1–P6, which are connected to the gate circuits G of the control devices Tr1–Tr6, respectively. Moreover, the microcomputer 1 feeds a high "H" or a low "L" output into the gate circuits G under instructions for each.

This embodiment of the present invention is constituted as described above and subsequently a load control system according to the present invention will be described by explaining how to control the lighting operation by the microcomputer 1.

Figure 8:
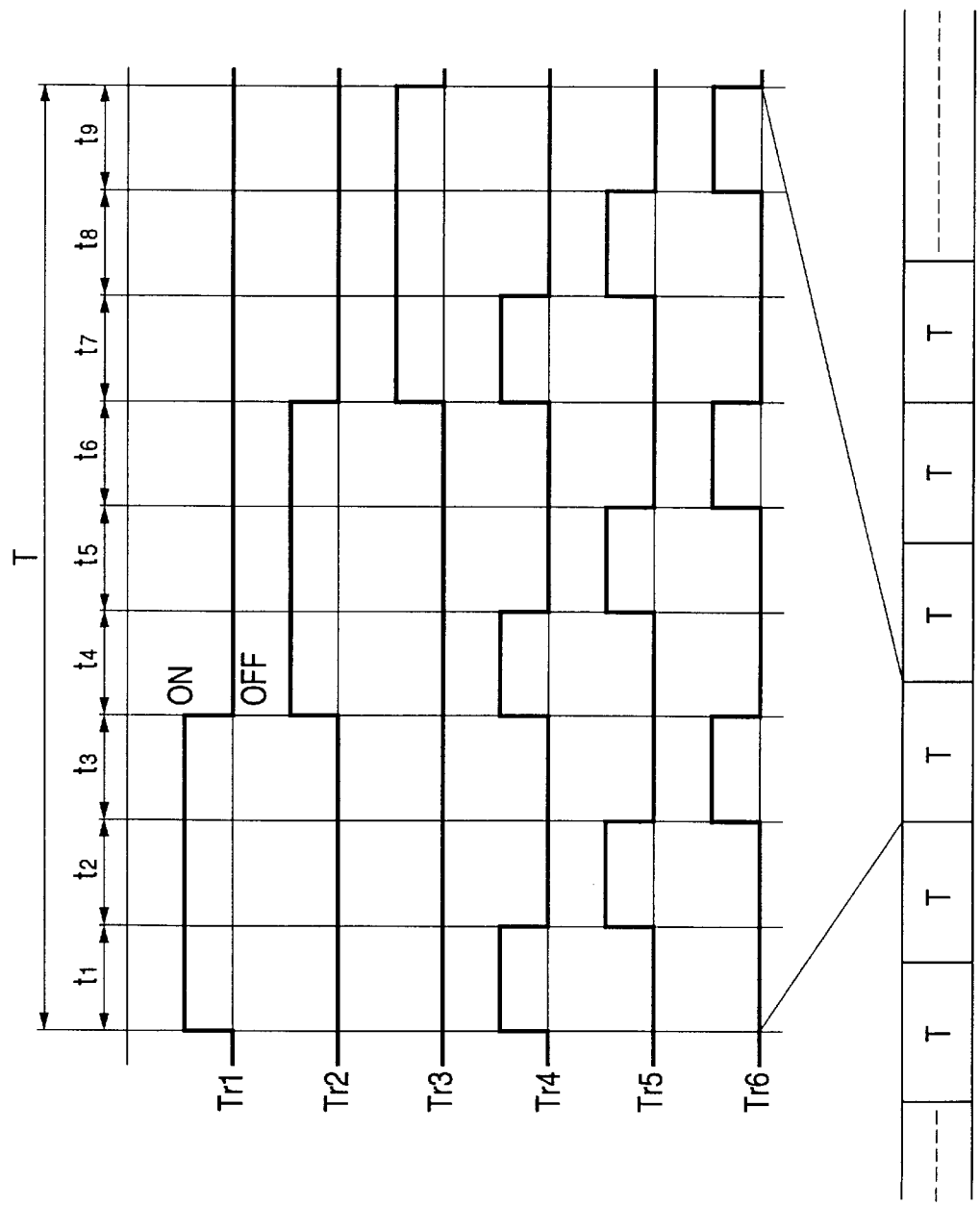
FIG. 8 is a timing chart of the third embodiment of the present invention.

In the load control system according to the present invention, time sharing control is repeated with a predetermined control period T as shown in FIG. 8.

At this time, the control period T is divided into time slots t1–t9 as shown in FIG. 8, for example, since there are nine lamps LP1–LP9.

As shown in FIG. 8, further, a high "H" and a low "L" are successively output from the ports P1–P3 and P4–P6 so as to turn on-off the control devices Tr1–Tr6 and all the lamps LP1–LP9 are turn on and off with the period T.

More specifically, the control device Tr1 is turned on during a period from t1–t3 and then the lamps LP1–LP3 are successively turned on by turning on Tr4–Tr6. Similarly, the control device Tr2 is turned on during a period from t4–t6 and then the lamps LP4–LP6 are successively turned on by turning on Tr4–Tr6. During a period t7–t9, the control device Tr3 is turned on and then the lamps LP7–LP9 are turned on by turning on Tr4–Tr6.

At this time, the whole lamp can be kept in the ON state through the time sharing process if the period T is set extremely short.

When one of the lamps LP1–LP9 is consequently lighted, it is only needed to turn on-off the control devices Tr1–Tr6 by controlling the ports P1–P3 and P4–P6 so as to activate the corresponding time slots t1–t9. When a plurality of lamps LP1–LP9 are simultaneously lighted, further, it is also needed to activate the corresponding time slots t1–t9 by controlling the ports P1–P3 and P4–P6.

Figure 9:
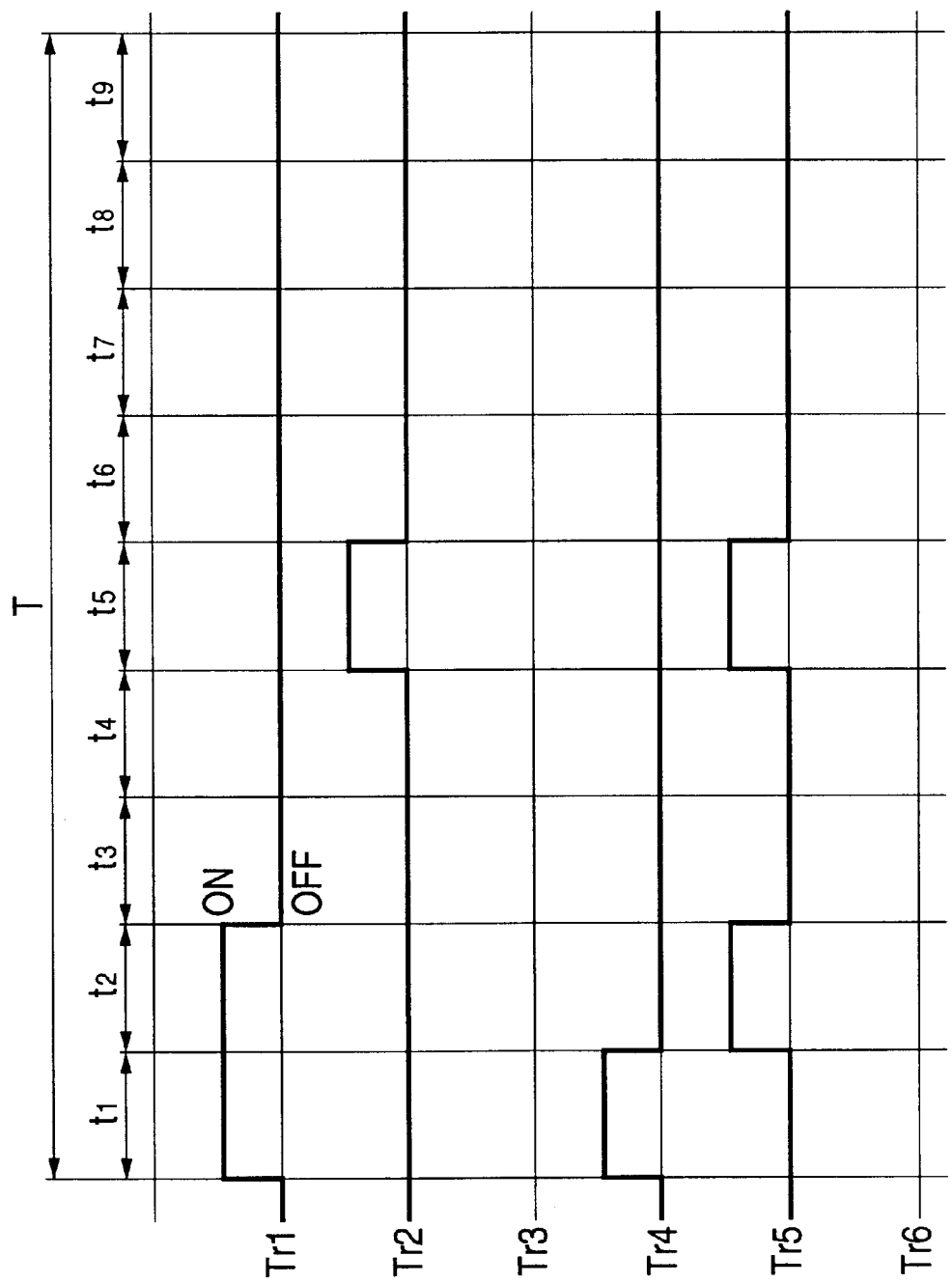
FIG. 9 is a timing chart of the third embodiment of the present invention.

When the plurality of lamps LP1, LP2, LP5 different in "line and row" are successively lighted, for example, the control devices Tr1 and Tr4 are turned on at the time slot t1 so as to light the lamp LP1 as shown in FIG. 9. The remaining control devices 2, 3, 5, 6 are turned off and the other lamps LP2–LP9 are turned off. At the time slot t2, the control devices Tr1 and Tr5 are turned on and the lamp LP2 is turned on. The other control devices 2, 3, 4, 6 are turned off and the other lamps LP1, 3–9 are turned off. At the time slot t5, the control devices Tr2 and Tr5 are simultaneously turned on and the other control devices Tr 1, 3, 4, 6 are turned off. With respect to the time slots t3, t4 and t6–t9, the whole control device Tr1–6 are turned off and the lamps LP3, LP4 and LP6–LP9 are not lighted.

The time sharing process with the period T reduced to an extremely short time is then repeated, so that only the lamps LP1, LP2, LP5 can successively be lighted.

When the lamps LP1, LP2, LP5 are lighted by performing the time sharing process, conventional inconvenience arising from causing even the undesired lamp LP4 to be lighted can be obviated.

If control is exerted in the time sharing control mode like this, mean current flowing into the load will decrease. In consequence, the lamp as a load becomes dim.

In order to prevent such an occurrence, a solution to this problem is to use bright lamps even at a low-tension current; however, it is uneconomical to use those specially made to order.

Fourth Embodiment

For the reason stated above, there is shown an arrangement as a fourth embodiment of the present invention in which the quantity of light can be increased by applying a voltage higher than a rated one to lamps LP1–LP9.

Figure 10:
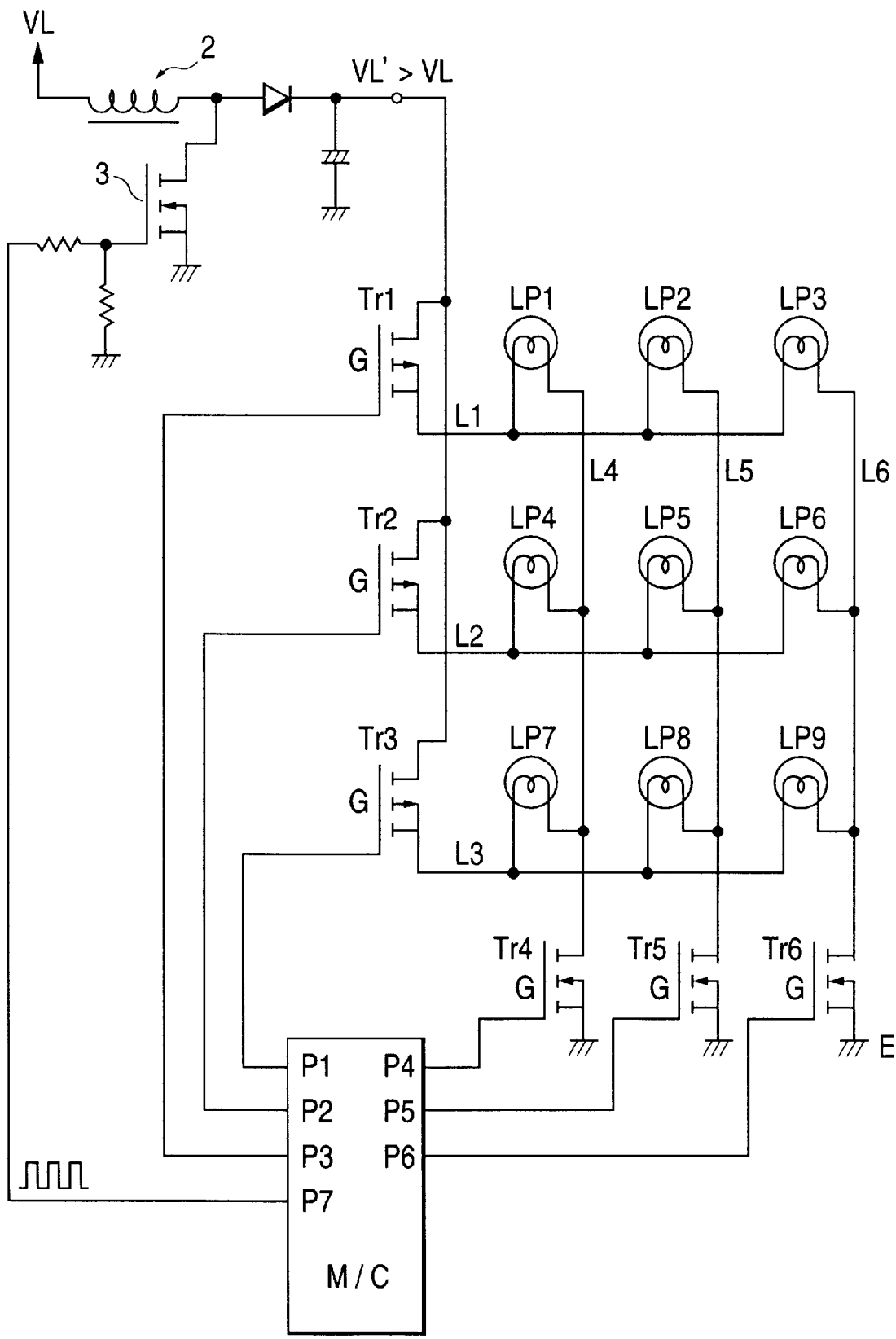
FIG. 10 is a block diagram of a fourth embodiment of the present invention.

More specifically, a step-up circuit 2 as shown in FIG. 10, for example, is installed between the power supply VL and the control devices Tr of the lamp control circuit described in the first embodiment of the present invention, so that the voltage higher than the rated one is applied to the lamps LP1–LP9.

Figure 11:
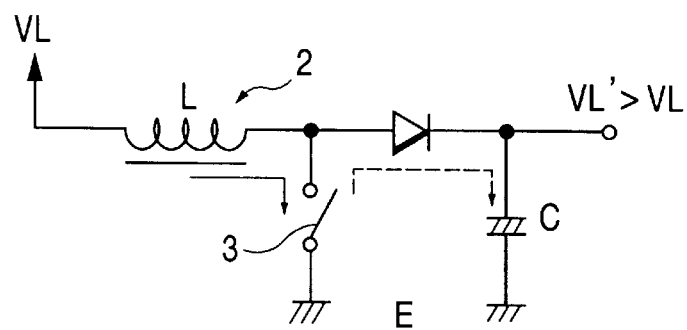
FIG. 11 is a diagram illustrating the function of the fourth embodiment of the present invention.

The step-up circuit 2 according to this embodiment of the present invention is a charge pump using a reactance element L and as shown in FIG. 11, a capacitor C is charged with the counter electromotive force generated by opening and closing a switch circuit 3 installed between the reactance element L and the earth E, whereby a high-tension voltage VL' (>VL) is output.

According to this embodiment of the present invention, an FET element is used as the switch circuit 3 and the gate circuit G of the FET element is connected to the output port P7 of the microcomputer 1. Thus, the step-up voltage VL' higher than the rated one is made applicable to the control devices Tr1–Tr6 by outputting a switching pulse from the output port P7.

This embodiment of the present invention is thus constituted and the voltage VL' higher than the rated one because of the step-up circuit 2 driven by the microcomputer 1 is applied to the lamps LP1–LP9, which are lighted brightly as a large current flows therethrough. Consequently, the quantity of light is prevented from lowering though each of the lamps LP1–LP9 is lighted in the time sharing control mode for an extremely short time as described in the first embodiment of the present invention.

The use of such a step-up circuit 2 makes it feasible to increase the quantity of light by the use of the conventional lamps LP1–LP9 without employing those specially made to order.

In other words, since the use of the step-up circuit 2 results in raising the mean current even in the time sharing control mode, the loads that have heretofore been used can be employed without any hindrance.

Incidentally, though the large current and the high-tension voltage VL' are applied to the lamps LP1–LP9 then, such a large current will not flow therethrough only for an extremely short time due to the time sharing control. Therefore, the lamps are prevented from being damaged on condition that the switching pulse or the time sharing control period is set so that the loss brought about by the applied voltage is less than the maximum permissible loss.

The arrangement above has also the effect of making adjustable the illuminance of the lamps LP1–LP9 as desired by setting the switching pulse or the time sharing control period as described above.

Although a description has been given of the use of the charge pump using the reactance L as the step-up circuit 2 according to the embodiments of the present invention, the invention is not limited to the embodiments thereof. For example, it may be acceptable to use a switching power supply of any other type and to set the source voltage VL itself higher than the rated voltage of the lamps LP1–LP9.

Although a description has been given of the use of the lamps LP1–LP9 as loads according to the embodiments of the present invention, the invention is not limited to the embodiments thereof, loads of any other type may be used as long as they are not affected by intermittent operation.

Although a description has been given of the two-dimensional matrix in both embodiments of the present invention, the invention is not limited to the use of such a matrix. For example, the invention is also applicable to an N-dimensional matrix as shown in FIG. 6.

As set forth above, the load control system for controlling the loads by the combination of control devices, the number of which is smaller than the number of loads according to the present invention is such that since the loads are driven in the time sharing control mode, any one of the desired load is made controllable by the control devices fewer than the loads without driving undesired ones.

Since the mean current can be boosted in the time sharing control mode by the use of the step-up circuit then, moreover, the loads that have heretofore been used become usable without any hindrance.

Fifth Embodiment

Figure 12:
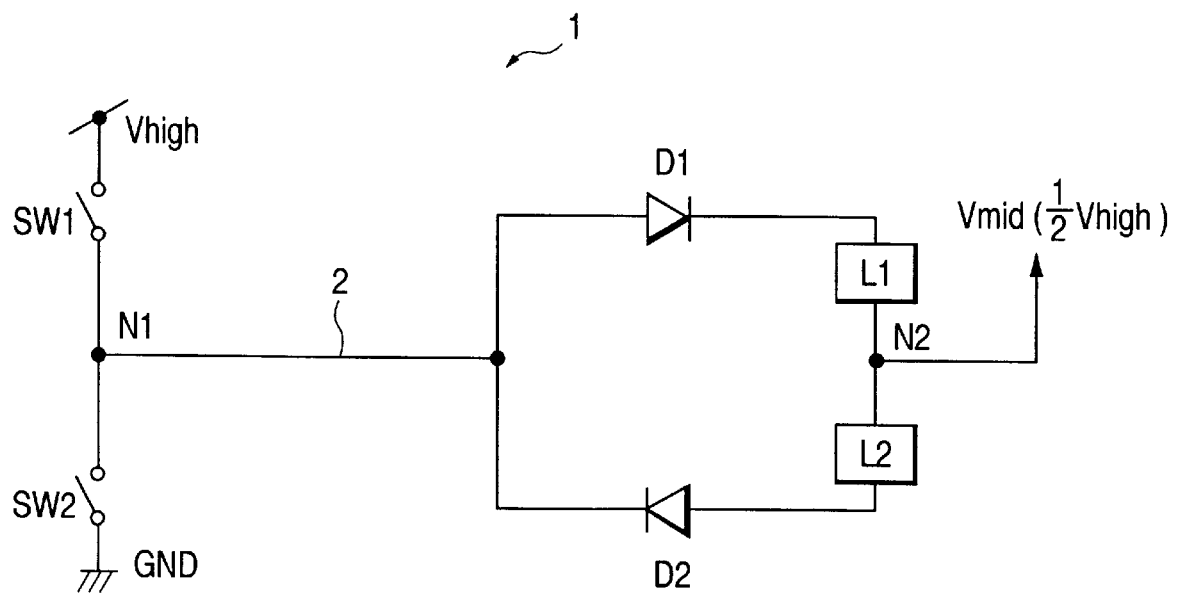
FIG. 12 is a block diagram of a load driving apparatus of a fifth embodiment of the present invention.

A load driving apparatus shown in FIG. 12 comprises a high-voltage power supply Vhigh for supplying 12 [V], a medium-voltage power supply Vmid for supplying 6 [V], a ground from a low-voltage power supply GND, a first and a second switch SW1, SW2 connected in series between the high-voltage power supply Vhigh and the low-voltage power supply GND, and a first and a second diode D1, D2 connected to one conductive wire 2 drawn from a node N1 where the switches SW1, SW2 are joined together.

The anode of the first diode D1 is connected to the conductive wire 2 and the cathode thereof is connected to the power supply terminal of the first load L1. Further, the cathode of the second diode D2 is connected to the conductive wire 2 and the anode thereof is connected to the ground terminal of the second load L2.

The ground terminal of the first load and the power supply terminal of the second load are connected together, and their connecting node N2 is connected to the medium-voltage power supply Vmid and always kept at 6 [V].

Since the connecting node N1 becomes 12 [V] when the first switch SW1 is turned on in the load driving apparatus 1, the first diode D1 is positively biased so as to supply the current to the first load L1, whereby the first load N1 is driven. Since the second diode D2 is reversely biased at this time, no current is supplied to the second load L2, whereby the second load L2 is not driven.

When the second switch SW2 is turned on, on the other hand, the connecting node N1 is reduced to the ground potential (0 V) and the current is supplied to the second load L2 as the second diode D2 is positively biased, whereby the second load L2 is driven. Since the first diode D1 is reversely biased at this time, no current is supplied to the first load L1, whereby the first load L1 is not driven.

Thus, the load driving apparatus 1 according to the present invention is capable of selectively driving the two loads L1, L2 by selecting the switches SW1, SW2 so as to change the direction of the current flowing through the conductive wire 2. In other words, the two loads L1, L2 and the switches SW1, SW2 can be coupled by means of one conductive wire 2.

Figure 13:
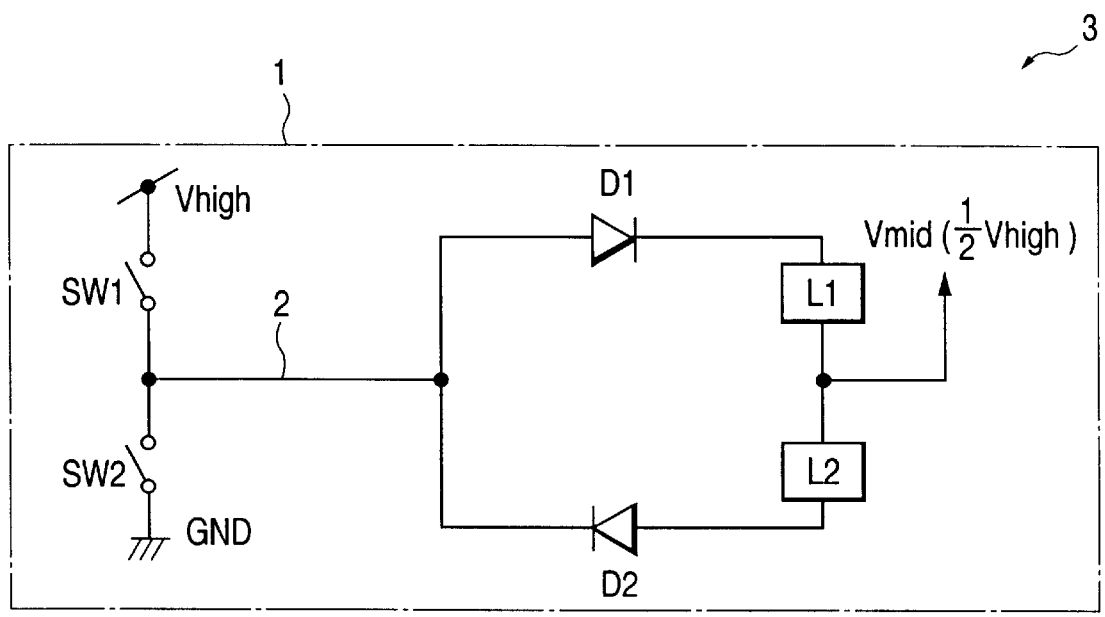
FIG. 13 is a block diagram of a load driving system of the fifth embodiment of the present invention.
Figure 13:
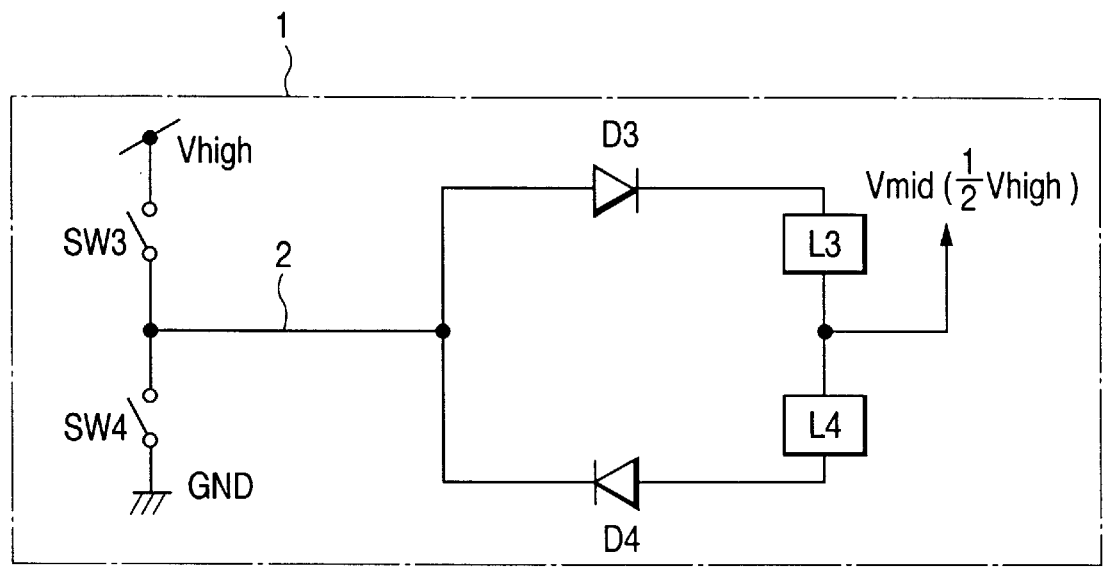

As shown in FIG. 13, further, the provision of a load driving system 3 built up by installing a plurality of load driving apparatus makes it possible to selectively drive a number of loads by conductive wires 2, the number of which may be half the number of loads. Therefore, automotive wire harness is simplified and this is convenient for automobiles and industrial machines to be designed and manufactured.

It has been arranged that the current is supplied to the power supply terminal of the load according to this embodiment of the present invention. If, however, a load is equipped with a relay, the load may be selected by supplying the current to the control terminal connected to the relay.

In the load driving system according to the present invention, about the half the voltage supplied by the high-voltage power supply is applied to the load. For this reason, a load of a low-voltage operating type may be used or otherwise a step-up circuit may be used for raising the existing source voltage to provide a high-voltage power supply. When such a step-up circuit is used to raise the voltage, the voltage applied to the load can be set equal to what has heretofore been employed, which is economical because conventional products are usable as long as loads are concerned. Moreover, a power supply before being stepped up may also be used as a medium-voltage power supply.

Figure 14:
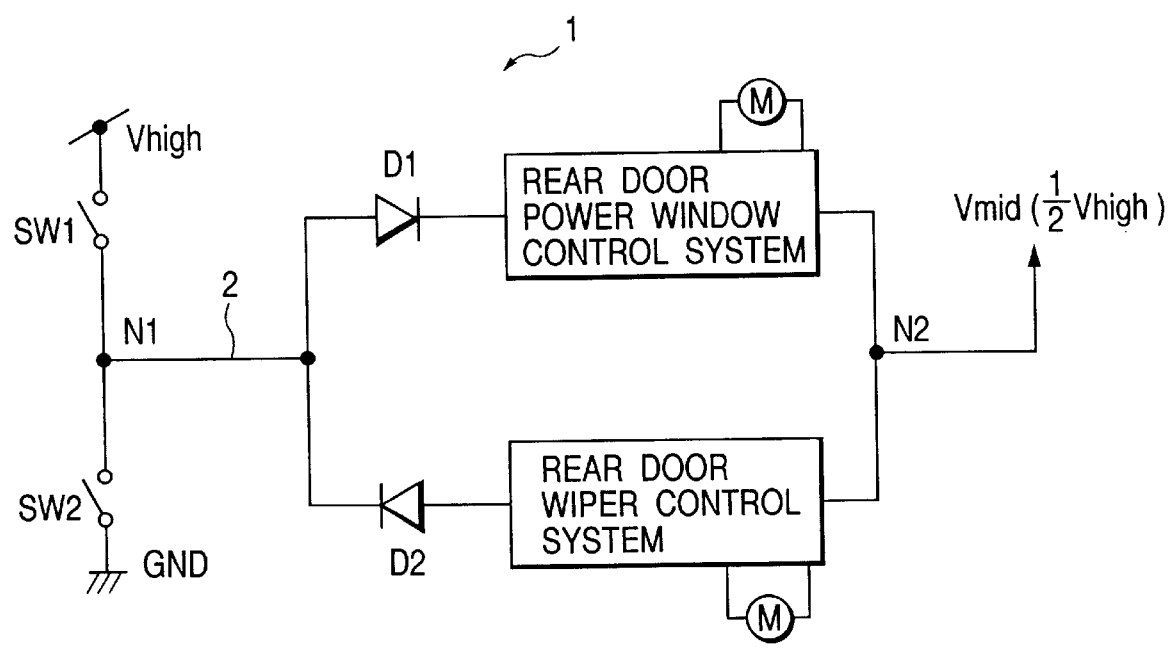
FIG. 14 is a diagram illustrating an application of the load driving apparatus according to the present invention to an automobile.

FIG. 14 is a diagram illustrating an application of the load driving apparatus 1 according to the present invention to an automobile. According to this embodiment of the present invention, a first load L1 is made a control system for controlling a back-door power window on the rear side of an RV vehicle and a second load L2 is made a control system for controlling a back-door wiper thereon. In the case of the back door of such an RV vehicle, the operation of opening and closing the window and that of the wiper are usually not performed simultaneously but alternatively at all times. Therefore, as shown in FIG. 14, the window is opened or closed by turning on-off the first switch SW1 to drive the power window motor via the power window control system, whereas the wiper is operated by turning on-off the second switch SW2 to drive the wiper motor via the wiper control system. Then one conductive wire 2 is sufficient to couple the switches SW1, SW2 and the loads. Consequently, the wire harness is simplified.

Figure 15:
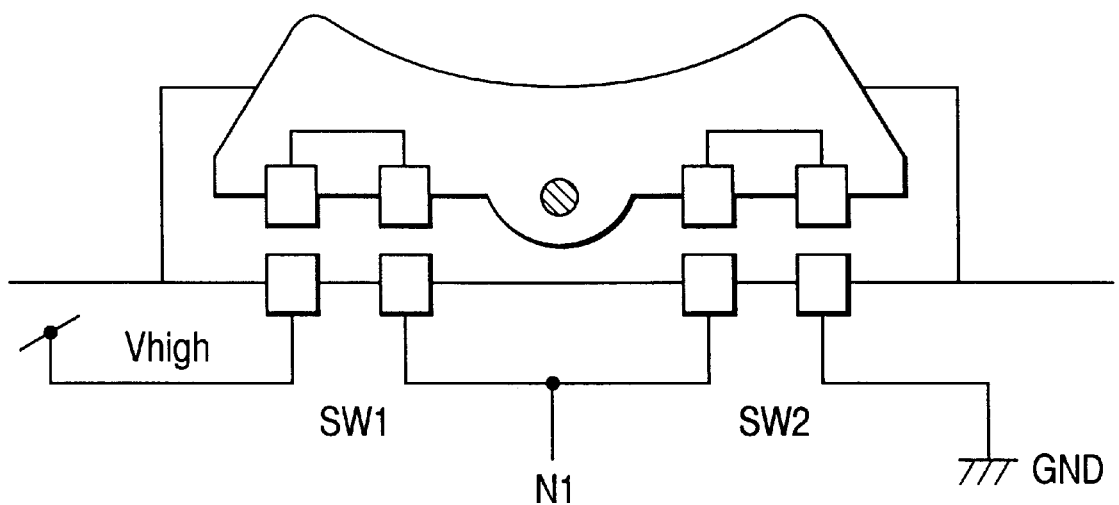
FIG. 15 is a side view explanatory of a switch.
Figure 16:
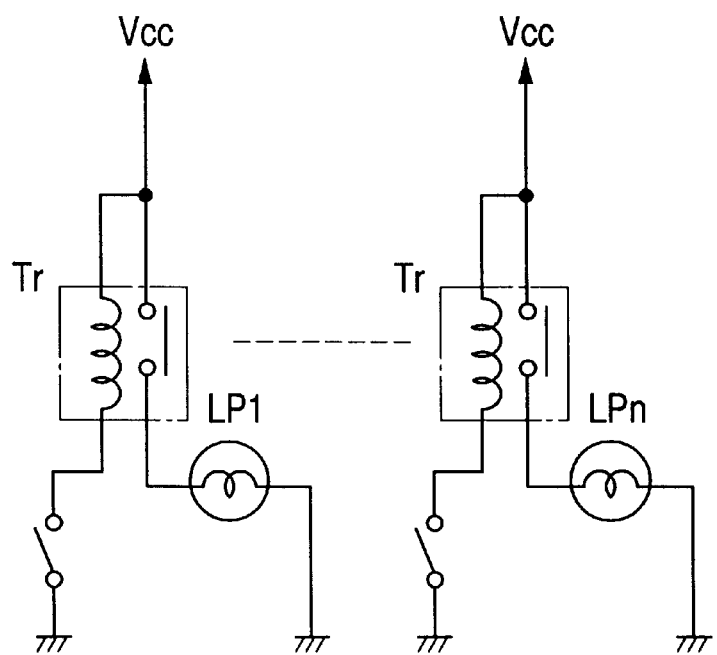
FIG. 16 is a connection diagram in the prior art.

Seesaw rotary type switches may be used for the aforementioned load drive selective switches as shown in FIG. 15, wherein only of the switches SW1, SW2 is turned on and both of them are never turned on simultaneously. These switches are convenient because the high-voltage power supply Vhigh and the low-voltage power supply GND are prevented from being short-circuited.

In the load driving apparatus and system arranged as set forth above according to the present invention, the number of conductive wires is reducible as compared with the prior art apparatus and system. As expensive devices such as microcomputers can be dispensed with, the present invention has the effect of contributing to bringing about a reduction in the production costs of automobiles, industrial machines and so forth in which a number of loads are required to be selectively driven.

What is claimed is:

1. A load control system for controlling a plurality of loads, comprising:

a plurality of control devices connected to a plurality of loads which are arranged with a plurality of intersecting lines and rows to form an N-dimensional matrix, the plurality of control devices include a first subset of control devices and a second subset of control devices, each control device of the first subset is installed on a respective line of the matrix and each control device of the second subset is installed on a respective row of the matrix such that the number of the control devices is less than the number of loads and each line is connected on a first end to a power supply by a respective control device of the first subset and a respective load through a reverse current prevention diode on a second end, and each row is connected on a first end to the respective load and a sound on a second end by a respective control device of the second subset whereby the respective load is activated when the respective control device of the first subset and the respective control device of the second subset are simultaneously turned on.

2. The load control system according to claim 1, wherein the respective line of the matrix and the respective row of the matrix are connecting wires.

3. The load control system according to claim 1, wherein each control device comprises at least one of a relay and a semi-conductor switching device.

4. The load control system according to in claim 1, wherein each load is controlled by a control device from the first subset and a control device from the second subset, the control devices are controlled by a time sharing control.

5. The load control system according to claim 4, wherein the respective control device of the first subset and the respective control device of the second subset are sequentially turned on.

6. The load control system according to claim 4, wherein the power supply provides a voltage higher than a rated voltage such that a mean current flowing into each load controlled by the time sharing control is equal to a current not controlled by the time sharing control.

7. A load driving apparatus for selectively driving a plurality of loads according to a current direction, the apparatus comprising:
- a power supply capable of changing a current direction by a switching pulse signal;
- a first load driven by a first current from the power supply when a switch is opened by the signal;
- a second load driven by a second current from the power supply in a direction reverse to the first current when the switch is closed by the signal; and
- a conductive wire connecting the power supply to the first and second loads.

8. A load driving apparatus for selectively driving a plurality of loads according to a current direction, the apparatus comprising:
- a high-voltage power supply;
- a medium-voltage power supply;
- a ground from a low-voltage power supply;
- a first switch and a second switch connected in series between said high-voltage power supply and said ground from a low-voltage power supply;
- a conductive wire having a common connecting node on a first end, said node being on a line connecting said first and second switches; and
- a first semi-conductor device and a second semi-conductor device, a first end of said first semi-conductor device being connected to a second end of said conducting wire and a second end of said first semi-conductor device being connected to said medium-voltage power supply at a semi-conductor node, and a first end of said second semi-conductor device being connected to said semi-conductor node and a second end of said second semi-conductor device being connected to said second end of said conducting wire.

* * * * *